(12) United States Patent
Tominaga

(10) Patent No.: US 10,571,753 B2
(45) Date of Patent: Feb. 25, 2020

(54) LIQUID CRYSTAL PANEL

(71) Applicant: Sharp Kabushiki Kaisha, Sakai, Osaka (JP)

(72) Inventor: Masakatsu Tominaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/188,550

(22) Filed: Nov. 13, 2018

(65) Prior Publication Data

US 2019/0162996 A1 May 30, 2019

(30) Foreign Application Priority Data

Nov. 29, 2017 (JP) ................................. 2017-229054

(51) Int. Cl.
*G02F 1/1333* (2006.01)
*G02F 1/1343* (2006.01)
*G02F 1/1339* (2006.01)
*G02F 1/1337* (2006.01)

(52) U.S. Cl.
CPC .......... *G02F 1/1343* (2013.01); *G02F 1/1337* (2013.01); *G02F 1/1339* (2013.01); *G02F 1/13338* (2013.01); *G02F 1/13394* (2013.01); *G02F 2001/13398* (2013.01); *G02F 2001/134372* (2013.01)

(58) Field of Classification Search
CPC .................................................. G02F 1/13338
See application file for complete search history.

(56) References Cited

U.S. PATENT DOCUMENTS

| 9,619,066 B2 | 4/2017 | Gwon et al. |
| 2016/0041665 A1 | 2/2016 | Gwon et al. |
| 2016/0124280 A1* | 5/2016 | Park .................. G02F 1/136286 349/43 |

FOREIGN PATENT DOCUMENTS

JP 2016-038594 A 3/2016

* cited by examiner

*Primary Examiner* — James A Dudek
(74) *Attorney, Agent, or Firm* — Keating & Bennett, LLP

(57) ABSTRACT

A liquid crystal panel includes a first substrate, a second substrate, a liquid crystal layer disposed between the first substrate and the second substrate, and a spacer. The first substrate includes pixel electrodes and position detection electrodes and the position detection electrodes detect an input position input with a position inputter based on electrostatic capacitances between the position inputter and the position detection electrodes. The second substrate has a display surface displaying an image thereon and is arranged opposite the first substrate and includes transparent electrodes overlapping the position detection electrodes, respectively. The spacer has conductivity and is disposed in a display region and between the first substrate and the second substrate and is contacted with one of the position detection electrodes and one of the transparent electrodes.

5 Claims, 12 Drawing Sheets

LIQUID CRYSTAL PANEL

CROSS REFERENCE TO RELATED APPLICATION

This application claims priority from Japanese Patent Application No. 2017-229054 filed on Nov. 29, 2017. The entire contents of the priority application are incorporated herein by reference.

TECHNICAL FIELD

The technology described herein relates to a liquid crystal panel.

BACKGROUND

There has been a liquid crystal panel including an in-cell touch panel function. Such a liquid crystal panel includes a pair of substrates having a liquid crystal layer therebetween, position detection electrodes (touch electrodes) disposed on one of the substrates, and pixel electrodes. A color filter is disposed on another one of the substrates.

In the liquid crystal panel including the position detection electrodes on one of the substrates, a touching operation is performed on a touch surface (a display surface) of the other substrate with a position inputter (such as a finger) that performs position input. In such an operation, the other substrate and the liquid crystal layer are between the position inputter and the position detection electrodes. Therefore, a distance between the position inputter and the position detection electrodes is large and detection accuracy of the touch position is likely to be lowered.

SUMMARY

The technology described herein was made in view of the above circumstances and an object is to increase position detection accuracy.

To solve the above problems, a liquid crystal panel according to the present technology includes a first substrate, a second substrate, a liquid crystal layer disposed between the first substrate and the second substrate, and a spacer. The first substrate includes pixel electrodes and position detection electrodes and the position detection electrodes detect an input position input with a position inputter based on electrostatic capacitances between the position inputter and the position detection electrodes. The second substrate has a display surface displaying an image thereon and is arranged opposite the first substrate and includes transparent electrodes overlapping the position detection electrodes, respectively. The spacer has conductivity and is disposed in a display region where the image is displayed and disposed between the first substrate and the second substrate and is contacted with one of the position detection electrodes and one of the transparent electrodes.

The position detection electrode and the transparent electrode are connected to each other with the conductive spacer such that the transparent electrode on the second substrate side can be used as the position detection electrode. According to such a configuration, compared to a configuration including the position detection electrode only on the first substrate side, the position detection electrode can be arranged closer to the display surface. Therefore, the position detection electrode can be much closer to the position inputter that is to be put on the display surface and the position detection accuracy can be increased. According to the configuration including both of the position detection electrode and the transparent electrode, compared to a configuration including only one of the electrodes, the resistance of the position detection electrode can be lowered and the position detection accuracy can be further increased.

According to the technology described herein, the position detection accuracy is further increased.

DETAILED DESCRIPTION

First Embodiment

Figure 1:
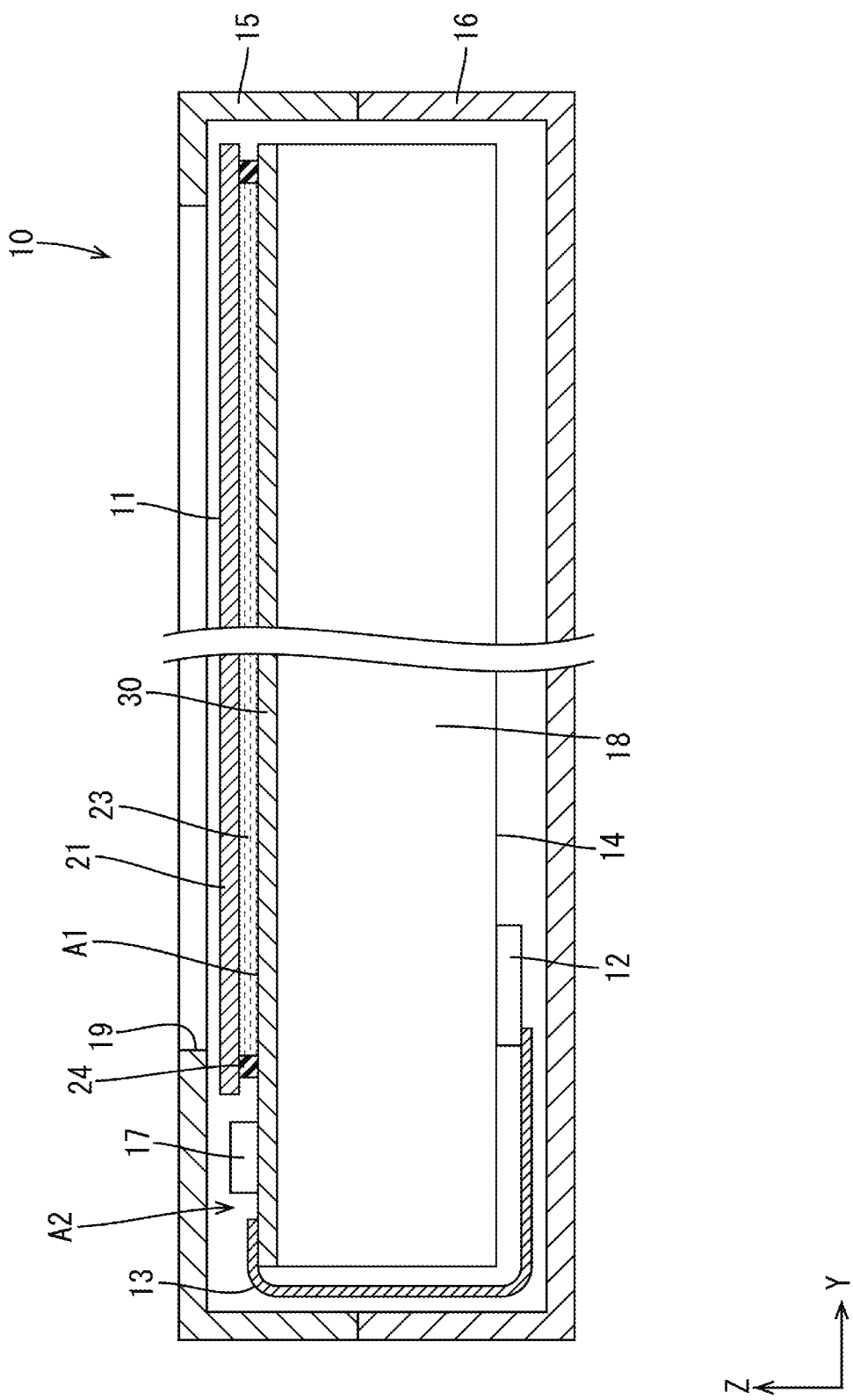
FIG. 1 is a schematic cross-sectional view illustrating a liquid crystal panel according to a first embodiment.

A first embodiment according to the present technology will be described with reference to FIGS. 1 to 6. As illustrated in FIG. 1, a liquid crystal display device 10 includes a liquid crystal panel 11 (a display panel), a control circuit board 12 (an external signal supply source) that supplies various kinds of input signals to a driver 17 of the liquid crystal panel 11, a flexible circuit board 13 (an external connection component) that electrically connects the liquid crystal panel 11 and the external control circuit board 12, and a backlight unit 14 (a lighting unit) that is an external light source supplying light to the liquid crystal panel 11. As illustrated in FIG. 1, the backlight unit 14 includes a chassis 18 having a substantially box shape that opens toward a front side (toward the liquid crystal panel 11), a light source (such as a cold cathode tube, an LED, an organic EL, which is not illustrated) arranged within the chassis 18, and an optical member (not illustrated) that covers an opening of the chassis 18. The optical member has a function of converting light rays emitted by the light source into planar light. The liquid crystal panel 11 includes a display region A1 where an image is displayed and a non-display region A2 that surrounds the display region A1.

As illustrated in FIG. 1, the liquid crystal display device 10 includes a pair of front and back side exterior members 15, 16 where the liquid crystal panel 11 and the backlight unit 14 are arranged. The front side exterior member 15 has an opening 19 through which an image displayed on the display region A1 of the liquid crystal panel 11 can be seen from outside. The liquid crystal display device 10 according to this embodiment may be included in various kinds of electronic devices such as liquid crystal televisions, mobile phones (including smartphones), notebook computers (including tablet computers), wearable terminals (including smart watches), handheld terminals (including electronic books and PDAs), portable video game players, and digital photo frames.

As illustrated in FIG. 1, the liquid crystal panel 11 includes a pair of substrates 21, 30 that are opposite each other, a liquid crystal layer 23 (a medium layer) containing liquid crystal molecules, which are substances that change optical characteristics when electromagnetic field is applied, and a sealing member 24 that is between the substrates 21 and 30 and surrounds the liquid crystal layer 23 to seal the liquid crystal layer 23. One of the substrates 21, 30 on the front (a front surface side, on an upper side in FIG. 1) is a CF substrate 21 (a counter substrate) and another one on the rear (a back surface side) is an array substrate 30 (an active matrix substrate, a component-side substrate). The liquid crystal layer 23 includes negative liquid crystals.

Figure 2:
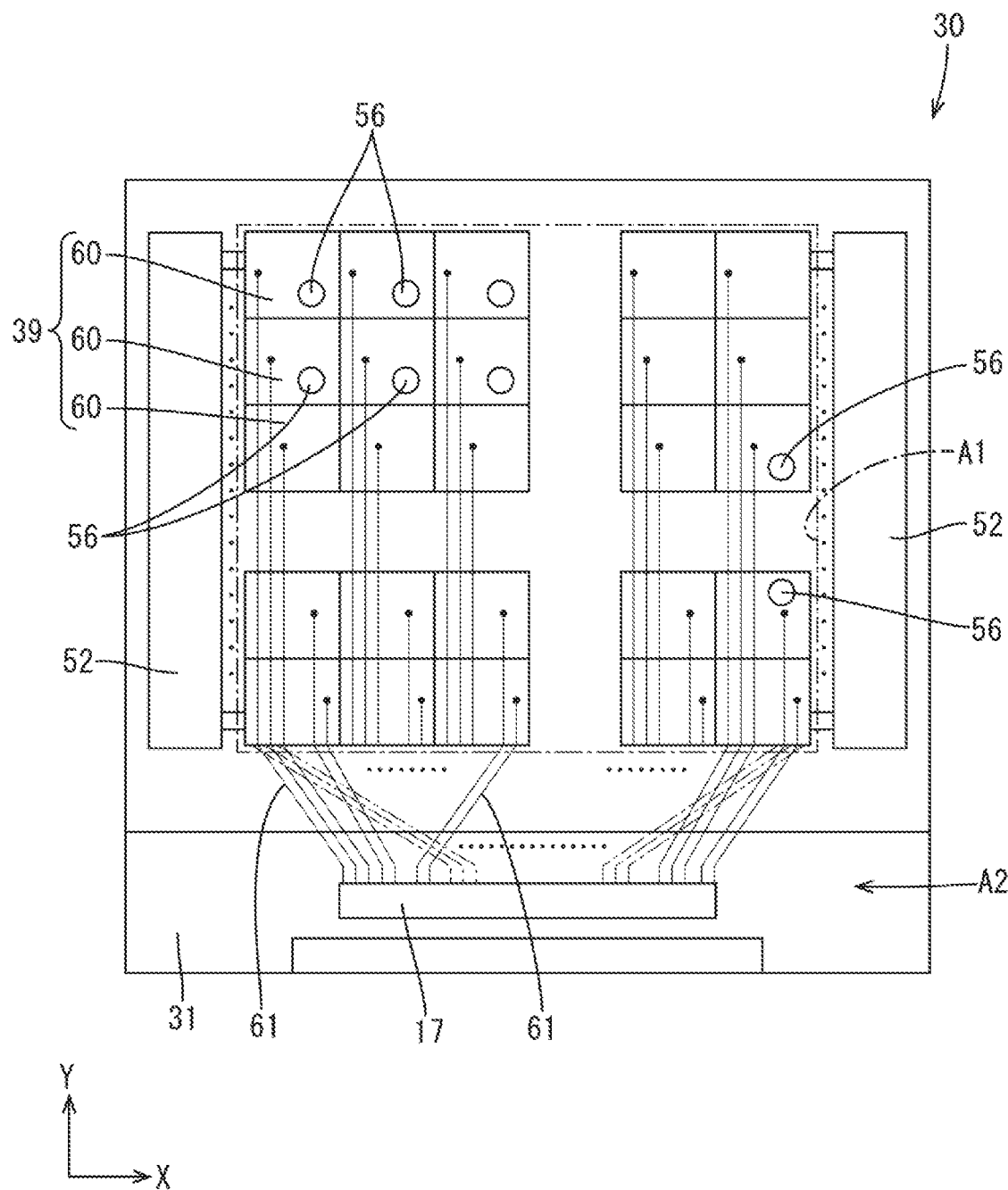
FIG. 2 is a schematic plan view illustrating an array substrate of the liquid crystal panel.
Figure 3:
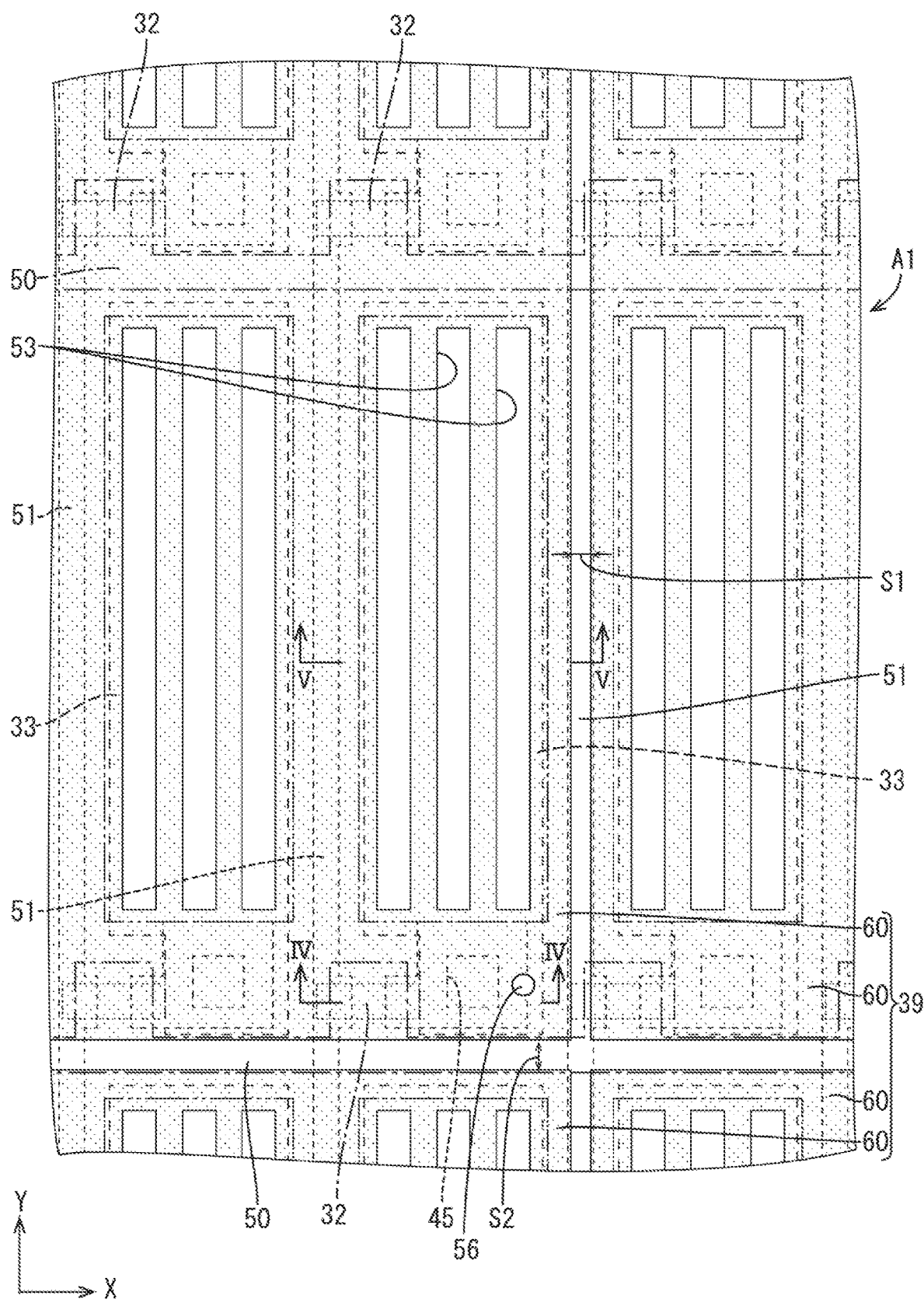
FIG. 3 is a plan view illustrating pixels of the array substrate.
Figure 4:
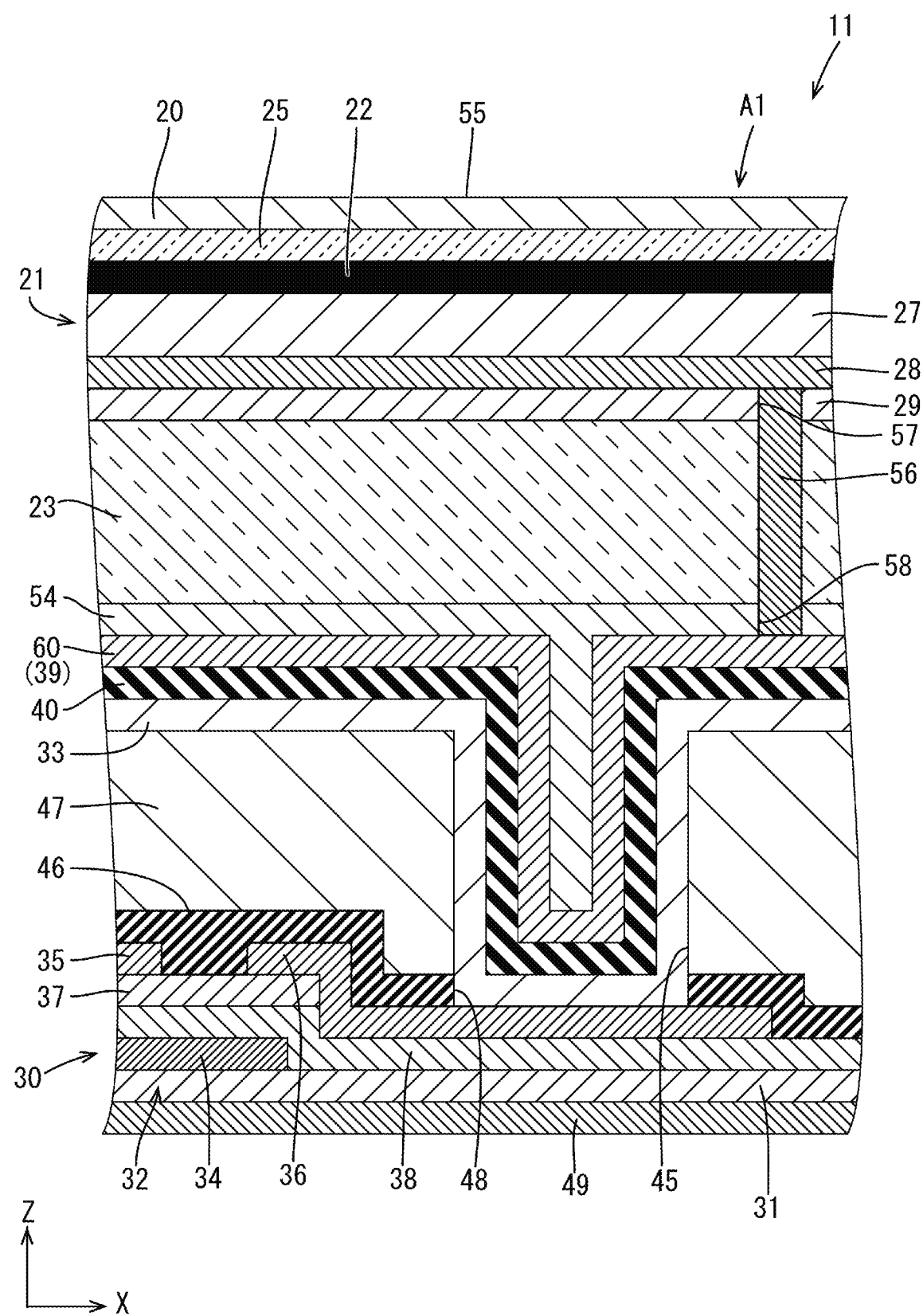
FIG. 4 is a cross-sectional view of the liquid crystal panel taken along line IV-IV in FIG. 3.

As illustrated in FIG. 2, the array substrate (a first substrate) is formed from a square glass substrate 31 and includes a driver 17 that drives the liquid crystal panel 11 on one side (a part of the non-display region A2) of the glass substrate 31. The array substrate 30 includes various types of films that are layered on an inner surface of the glass substrate 31 with the photolithography method. As illustrated in FIG. 4, a polarizing plate 49 is attached to an outer surface of the glass substrate 31. Thin film transistors 32 (TFTs: display components), which are switching components, and pixel electrodes 33 are disposed in the display region A1 and on an inner surface side (a liquid crystal layer 23 side) of the glass substrate 31. As illustrated in FIG. 3, the pixel electrodes 33 are arranged in a matrix (in rows and columns) in the display region A1.

The TFTs 32 are included in a lower layer than the pixel electrodes 33 and are arranged in a matrix (rows and columns) in the display region A1. The TFTs 32 are connected to the respective pixel electrodes 33. As illustrated in FIG. 4, the TFT 32 includes a gate electrode 34, a source electrode 35, a drain electrode 36, and a channel section 37. The channel section 37 overlaps the gate electrode 34 and a gate insulation film 38 is present between the channel section 37 and the gate electrode 34. The channel section 37 connects the source electrode 35 and the drain electrode 36. An insulation film 46 and a flattening film 47 are included in an upper layer than the channel section 37, the source electrode 35, and the drain electrode 36. The pixel electrode 33 is formed on the flattening film 47. The drain electrode 36 is electrically connected to the pixel electrode 33 through a contact hole 45 formed in the flattening film 47 and a contact hole 48 formed in the insulation film 46. The flattening film 47 (an organic insulation film) is made of organic material such as acrylic resin (for example PMMA) and has a film thickness greater than that of each of the insulation films 38, 46, 40.

Each of the gate electrode 34, the source electrode 35, and the drain electrode 36 is a multilayer film that includes titanium (Ti) and copper (Cu). However, it is not limited thereto. As illustrated in FIG. 3, gate lines 50 and source lines 51 are arranged in a grid around the TFTs 32 and the pixel electrodes 33. The gate electrode 34 is connected to the gate line 50 and the source electrode 35 is connected to the source line 51. The gate lines 50 are connected to a gate driver 52 illustrated in FIG. 2. In this embodiment, a pair of gate drivers 52 is formed monolithically on the glass substrate 31 and the gate lines 50 are connected to one of the gate drivers 52. The source lines 51 are connected to the driver 17. The TFT 32 is driven according to a signal supplied to the source line 51 from the driver 17 (a source driver) and a signal supplied to the gate line 50 from the gate driver 52. According to the driving, potential supply to the pixel electrode 33 is controlled. Accordingly, the pixel electrode 33 is driven by the driver 17 and the gate driver 52 via the TFT 32.

The liquid crystal panel 11 has a displaying function of displaying an image and a touch panel function (a position inputting function) of detecting a position (an input position) input by a user based on the displayed image. The liquid crystal panel 11 includes (integrally) an in-cell touch panel pattern for exerting the touch panel function. The touch panel pattern is a so-called projected capacitive touch panel pattern and a detection method of a self-capacitance type is used. As illustrated in FIG. 2, the touch panel pattern includes position detection electrodes 60 arranged in a matrix within a plate surface area of the glass substrate 31 of the array substrate 30. The position detection electrode 60 is formed from a transparent conductive film and disposed in the display region A1. In this embodiment, a common electrode 39 of the array substrate 30 is formed from the position detection electrodes 60.

The position detection electrodes 60 are connected to the respective position detection lines 61. The position detection lines 61 are connected to the driver 17. The driver 17 is configured to drive the position detection electrodes 60. Specifically, the driver 17 supplies a common signal (a reference potential signal) for the display function and a touch signal (a position detection signal) for the touch function to the position detection electrode 60 at a different timing. When the position detection electrode 60 is supplied with the touch signal, a user of the liquid crystal panel 11 puts his/her finger (a position inputter), which is a conductive member, closer to a surface (a display surface) of the liquid crystal panel 11, an electrostatic capacitance is induced between the finger and the position detection electrode 60. The electrostatic capacitance detected at the position detection electrode 60 near the finger is changed according to the approach of the finger and the electrostatic capacitance detected at the position detection electrode 60 near the finger differs from that detected at the position detection electrode 60 far away from the finger. According to such difference, the input position input by the finger is detected. The common signal is transferred to all of the position detection electrodes 60 at a same timing such that all of the position detection electrodes 60 are at the reference potential and function as the common electrode 39.

As illustrated in FIG. 4, the array substrate 30 includes the position detection electrodes 60 on a front side of the pixel electrodes 33. Namely, the position detection electrodes 60 (the common electrode 39) are closer to the liquid crystal layer 23 than the pixel electrodes 33 are. An insulation film 40 is present between the pixel electrodes 33 and the position detection electrodes 60. Each of the gate insulation film 38, the insulation film 40, 46 is a multilayer film including silicon oxide ($SiO_2$) and silicon nitride ($SiN_x$). However, it is not limited thereto. The pixel electrodes 33 and the position detection electrodes 60 are formed from a transparent electrode film such as indium tin oxide (ITO) or indium zinc oxide (IZO). However, it is not limited thereto. The position detection electrode 60 has slits 53 as illustrated in FIG. 3.

When potential difference is caused between the pixel electrode 33 and the position detection electrode 60, which are overlapped with each other, according to charging of the pixel electrode 33, a fringe field (an oblique field) including a component in a direction normal to a plate surface of the array substrate 30 is generated between a slit opening edge of the position detection electrode 60 and the pixel electrode 33 in addition to a component in a direction along the plate surface of the array substrate 30. Therefore, alignment of the liquid crystal molecules in the liquid crystal layer 23 can be properly controlled with utilizing the fringe field. The liquid crystal panel 11 of this embodiment operates in a fringe field switching (FFS) mode. An alignment film 54 is disposed to cover the position detection electrodes 60 from the liquid crystal layer 23 side. In FIG. 3, the input detection electrodes 60 are illustrated with shading and arranged to overlap the pixel electrodes 33. A space 51 is provided between two position detection electrodes 60 that are adjacent to each other in the X-axis direction and the source line 51 is disposed overlapping the space S1. A space S2 is provided between two position detection electrodes 60 that are adjacent to each other in the Y-axis direction and the gate line 50 is disposed overlapping the space S2.

Figure 5:
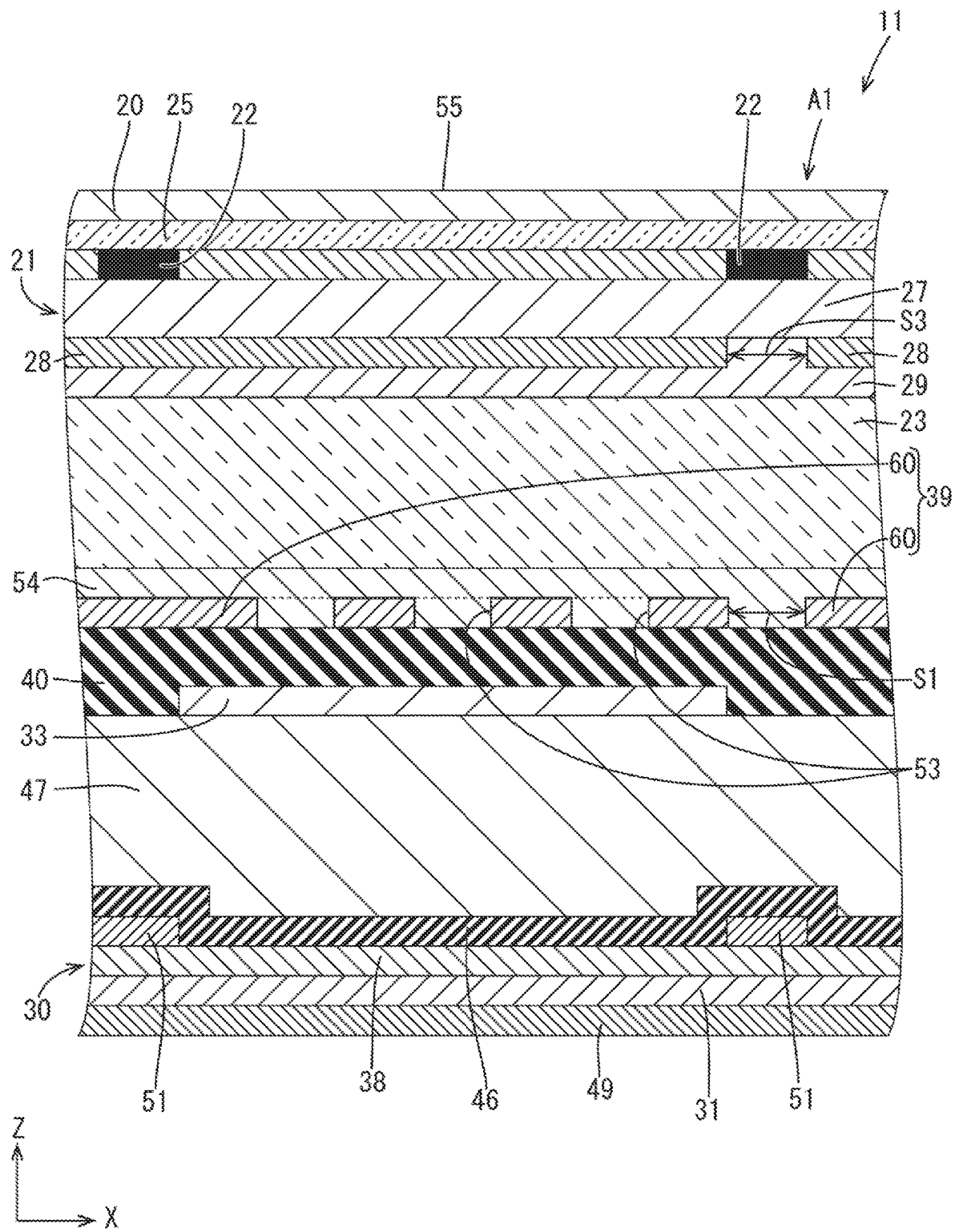
FIG. 5 is a cross-sectional view of the liquid crystal panel taken along line V-V in FIG. 3.
Figure 6:
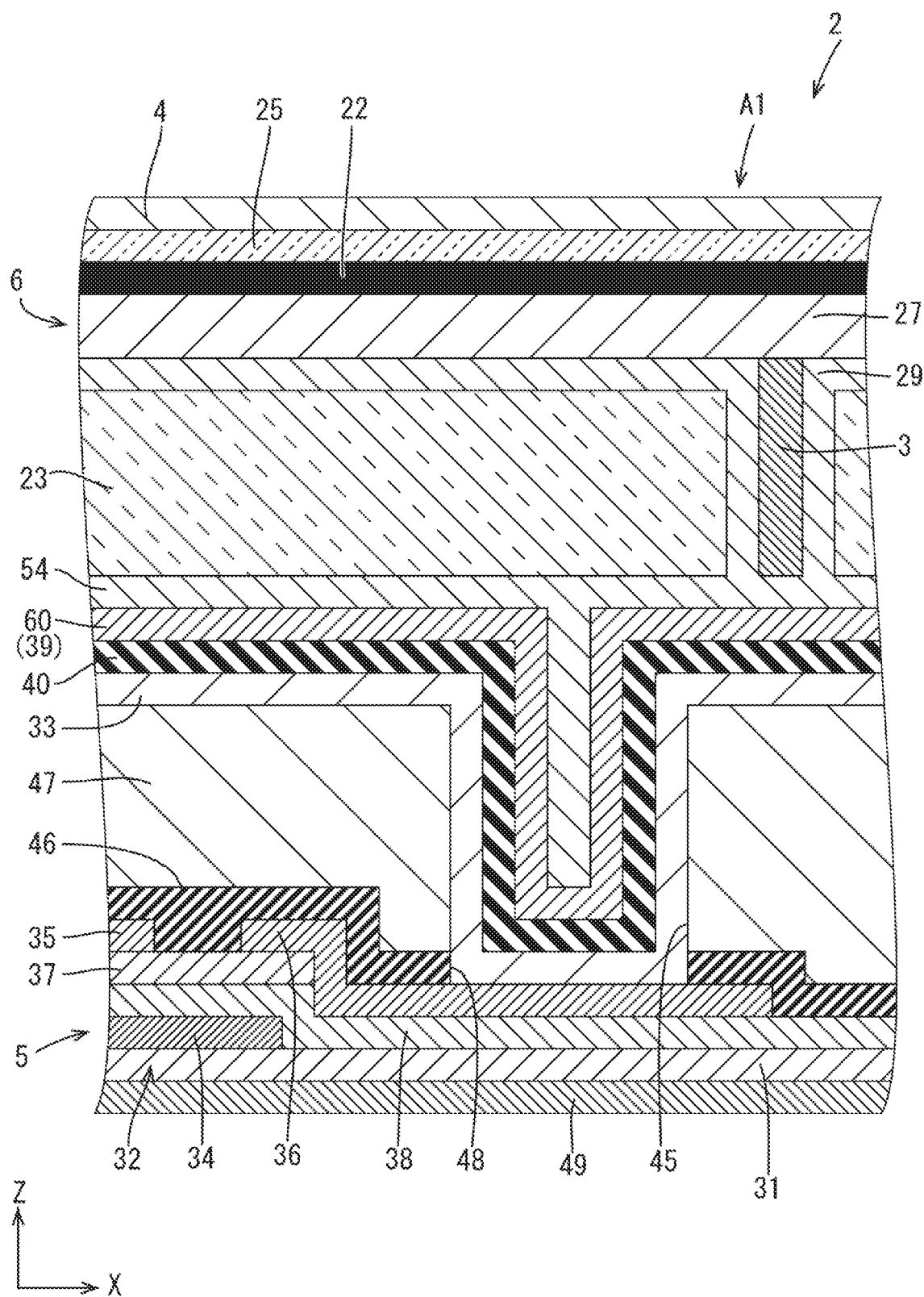
FIG. 6 is a cross-sectional view of a liquid crystal panel of Comparative Example.

The CF substrate 21 (a second substrate) is disposed opposite the array substrate 30. As illustrated in FIGS. 4 and 5, the CF substrate 21 includes a color filter 26, an overcoat film 27, a transparent electrode 28, an alignment film 29 on an inner surface side (a liquid crystal layer 23 side) of a glass substrate 25. The color filter 26 includes three color portions (two color portions are illustrated in FIG. 5) of red (R), green (G), and blue (B) that are arranged in a matrix. Each of the color portions is opposite each pixel of the array substrate 30. A black matrix 22 is included between the adjacent color portions. A polarizing plate 20 is disposed on an outer surface of the glass substrate 25. The CF substrate 21 has a surface (an outer surface of the polarizing plate 20) that is a display surface 55 on which an image is displayed.

The transparent electrode 28 is formed from the transparent electrode film of indium tin oxide (ITO) or indium zinc oxide (IZO). However, it is not limited thereto. The position detection electrode 60 and the transparent electrode 28 have a square plate shape. As illustrated in FIG. 5, each of the transparent electrodes 28 overlaps a corresponding one of the position detection electrodes 60. As illustrated in FIG. 5, a space S3 between the two adjacent transparent electrodes 28 overlaps the space (S1 in FIG. 5) between the adjacent two position detection electrodes 60. In the display region A1, spacers 56 are disposed between the CF substrate 21 and the array substrate 30 to define an opposite distance between the CF substrate 21 and the array substrate 30. As illustrated in FIG. 4, the spacer 56 has a columnar shape and conductivity and is contacted with the position detection electrode 60 and the transparent electrode 28. Accordingly, the transparent electrode 28 is electrically connected to the position detection electrode 60 and functions as a position detection electrode (and the common electrode) on the CF substrate 21 side. The alignment films 29, 54 have through holes 57, 58, respectively, at positions corresponding to the spacers 56 such that the transparent electrode 28 and the position detection electrode 60 are partially exposed.

The transparent electrode 28 is electrically connected to the position detection electrode 60 that is opposite the transparent electrode 28 with having the spacer 56 therebetween. Each of the transparent electrodes 28 is connected to a corresponding one of the position detection electrodes 60 via a corresponding one of the spacers 56. At least one spacer 56 is provided for one position detection electrode 60. In FIG. 2, some of the spacers 56 are illustrated. The spacer 56 that is formed of conductive material has conductivity.

The spacer 56 may be provided with conductivity by containing conductive particles such as metal particles (such as gold particles, silver particles, and copper particles) therein.

Next, advantageous effects of this embodiment will be described. First, a liquid crystal panel 2 according to Comparative Example illustrated in FIG. 6 will be described. In the liquid crystal panel 2, a spacer 3 has no conductivity and a transparent conductive film 4 is disposed on an outer surface of the glass substrate 25. The transparent conductive film 4 has a function of restricting a CF substrate 6 from being charged and has no function of the position detection electrode (the common electrode). Namely, the position detection electrode (the common electrode) is disposed only on the array substrate 5 side. In the present embodiment, the position detection electrode 60 and the transparent electrode 28 (the transparent electrode on the CF substrate 21 side) are connected to each other with the conductive spacer 56 such that the transparent electrode 28 on the CF substrate 21 side can be used as the position detection electrode. According to such a configuration, compared to the configuration including the position detection electrode 60 only on the array substrate 30 side, the position detection electrode can be arranged closer to the display surface 55. Therefore, the position detection electrode can be much closer to the position inputter that is to be put on the display surface 55 and the position detection accuracy can be increased. According to the configuration including both of the position detection electrode 60 and the transparent electrode 28, compared to the configuration including only one of the electrodes, the resistance of the position detection electrode can be lowered. Therefore, the signal delay of the position detection signal that may be caused by the resistance of the position detection electrode is less likely to be caused. Accordingly, the position detection accuracy can be further increased.

The CF substrate 21 including the transparent electrode 28 is less likely to be charged with static electricity and the alignment of the liquid crystals in the liquid crystal layer 23 is less likely to be disturbed. The configuration of the CF substrate including the transparent conductive film (the transparent conductive film 4 or the transparent electrode 28) is same in Comparative Example in FIG. 6 and the present embodiment. Therefore, the number of producing steps is same in the present embodiment and Comparative Example and is not increased in the present embodiment. The spacers 56 can be arranged as appropriate within an entire area of the display region A1. If the sealing member 24 has conductivity and connects the position detection electrode 60 and the transparent electrode 28, among the position detection electrodes 60 arranged in a matrix, only the position detection electrodes 60 arranged on the outer edge portion are connected to the transparent electrodes 28. However, in this embodiment, each of the position detection electrodes 60 is connected to each of the transparent electrodes 28 with the spacers 56.

The driver 17 that drives the pixel electrodes 33 and the position detection electrodes 60 is arranged on the array substrate 30. The driving signals (the touch signals for the touch function) supplied to the position detection electrode 60 from the driver 17 are supplied to the transparent electrode 28 through the spacer 56. Accordingly, the driver 17 for supplying the driving signals to the transparent electrode 28 is not necessary to be arranged on the CF substrate 21. The driver 17 is configured to drive the pixel electrode 33. Therefore, compared to a configuration including both of a driver for pixel electrodes and a driver for position detection electrodes, the configuration of the present embodiment is simplified.

The position detection electrodes 60 are arranged closer to the liquid crystal layer 23 than the pixel electrodes 33 are. According to such a configuration, the pixel electrode 33 is not present between the position detection electrode 60 and the transparent electrode 28 and the pixel electrode 33 is not contacted with the spacer 56. Therefore, design flexibility of the arrangement of the spacers 56 is increased. The position detection electrode 60 is present between the pixel electrode 33 and the transparent electrode 28. Therefore, even if a conductive foreign obstacle enters the liquid crystal layer 23, the pixel electrode and the transparent electrode 28 are less likely to be electrically connected to each other with the foreign obstacle.

The position detection electrodes 60 configure the common electrode 39 that overlaps the pixel electrodes 33. The position detection electrodes 60 function as the common electrode 39 and the electrodes are commonly used for the position detection electrodes 60 and the common electrode 39. Therefore, the number of components is less likely to be increased. The transparent electrodes 28 connected to the position detection electrodes 60 with the spacers 56 can be also used as the common electrode. According to such a configuration, resistance of the common electrode can be lowered compared to a configuration where only the position detection electrodes 60 are used as the common electrode. As a result, the signal delay of the common signal supplied to the common electrode is less likely to be caused and display quality is further improved.

The liquid crystal layer 23 includes negative liquid crystals. If the liquid crystal layer 23 includes positive liquid crystals and potential difference is caused between the pixel electrode 33 and the transparent electrode 28, the liquid crystal molecules are vertically aligned and the light transmittance is lowered. In the liquid crystal layer including the negative liquid crystals, if the potential difference is caused between the pixel electrode 33 and the transparent electrode 28, the liquid crystals are horizontally aligned and the light transmittance of the liquid crystal layer 23 is less likely to be lowered. In the present embodiment, the positive liquid crystals may be used. However, the negative liquid crystals may be preferable because of the above-described reasons.

Second Embodiment

Figure 7:
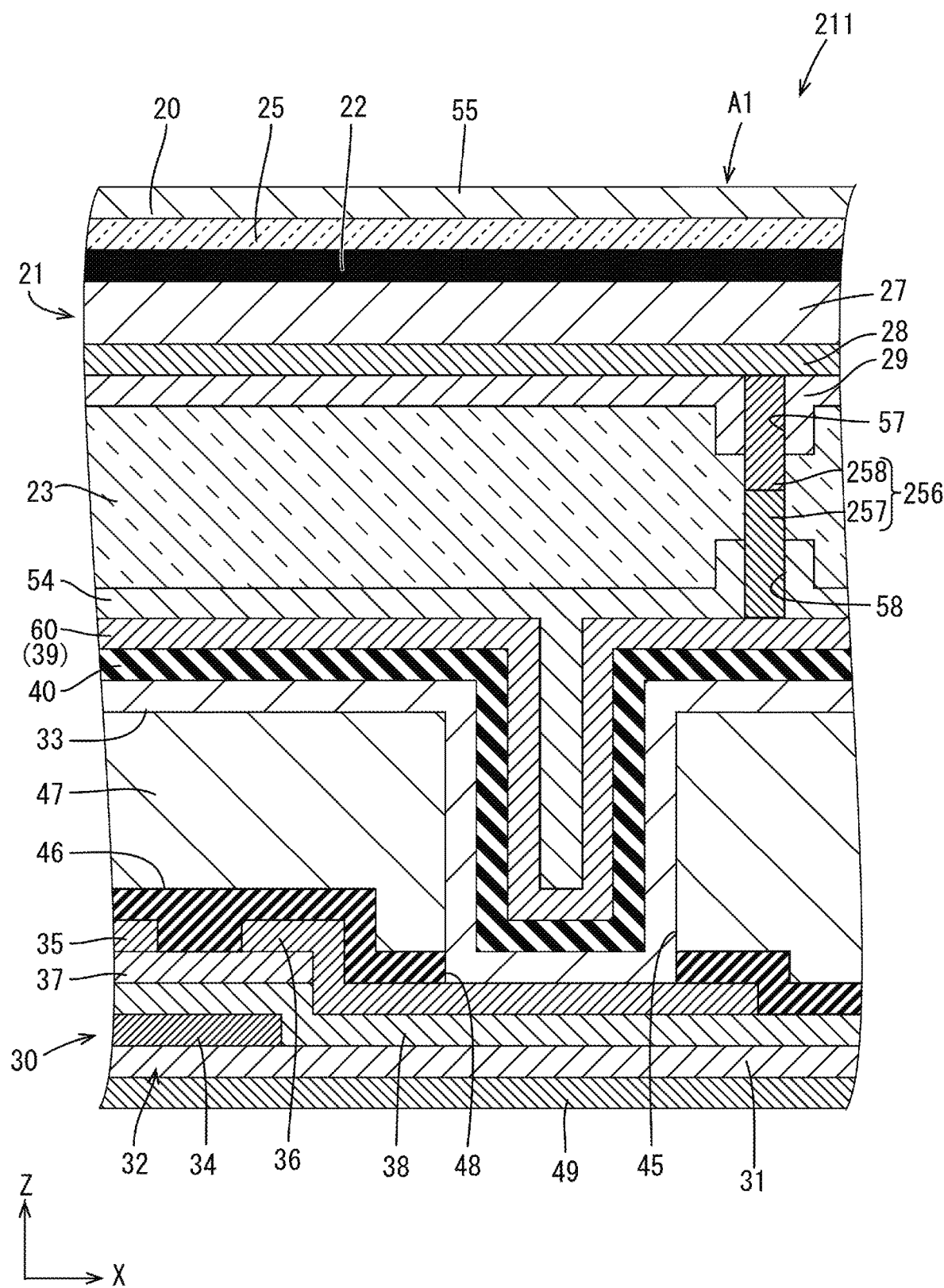
FIG. 7 is a cross-sectional view of a liquid crystal panel according to a second embodiment.

Next, a second embodiment will be described with reference to FIG. 7. Components same as those of the above embodiment are provided with the same symbols and will not be described. A spacer of a liquid crystal panel 211 of this embodiment has a configuration different from that of the above embodiment. As illustrated in FIG. 7, a spacer 256 of this embodiment includes a first projecting section 257 projecting from the position detection electrode 60 toward the transparent electrode 28 and a second projecting section 258 projecting from the transparent electrode 28 toward the position detection electrode 60 and having a projected end that is contacted with a projected end of the first projecting section 257. In this embodiment, in a process of producing the array substrate 30, after forming the first projecting section 257 on the position detection electrode 60, the alignment film 54 (a first alignment film between the position detection electrode and the liquid crystal layer) is formed. In a process of producing the CF substrate 21, after forming the second projecting section 258 on the transparent electrode 28, the alignment film 29 (a second alignment film between the transparent electrode and the liquid crystal layer) is formed.

In the configuration including the alignment film between the electrode and the liquid crystal layer, if the spacer is arranged after forming the alignment film, it is necessary to remove a part of the alignment film with etching to uncover the electrode and contact the spacer with the electrode. In the present embodiment, the electrode (the position detection electrode 60 and the transparent electrode 28) includes a projection (the first projecting section 257 and the second projecting section 258) such that a section of the electrode where the projection is formed is not covered with the alignment film when disposing the alignment film on the electrode. The spacer 256 is configured with a pair of projections (the first projecting section 257 and the second projecting section 258) such that an operation of removing a part of the alignment film 29 and the alignment film 54 (an operation of forming the through holes 57, 58 in the alignment films 29, 54) is not necessary.

Third Embodiment

Figure 8:
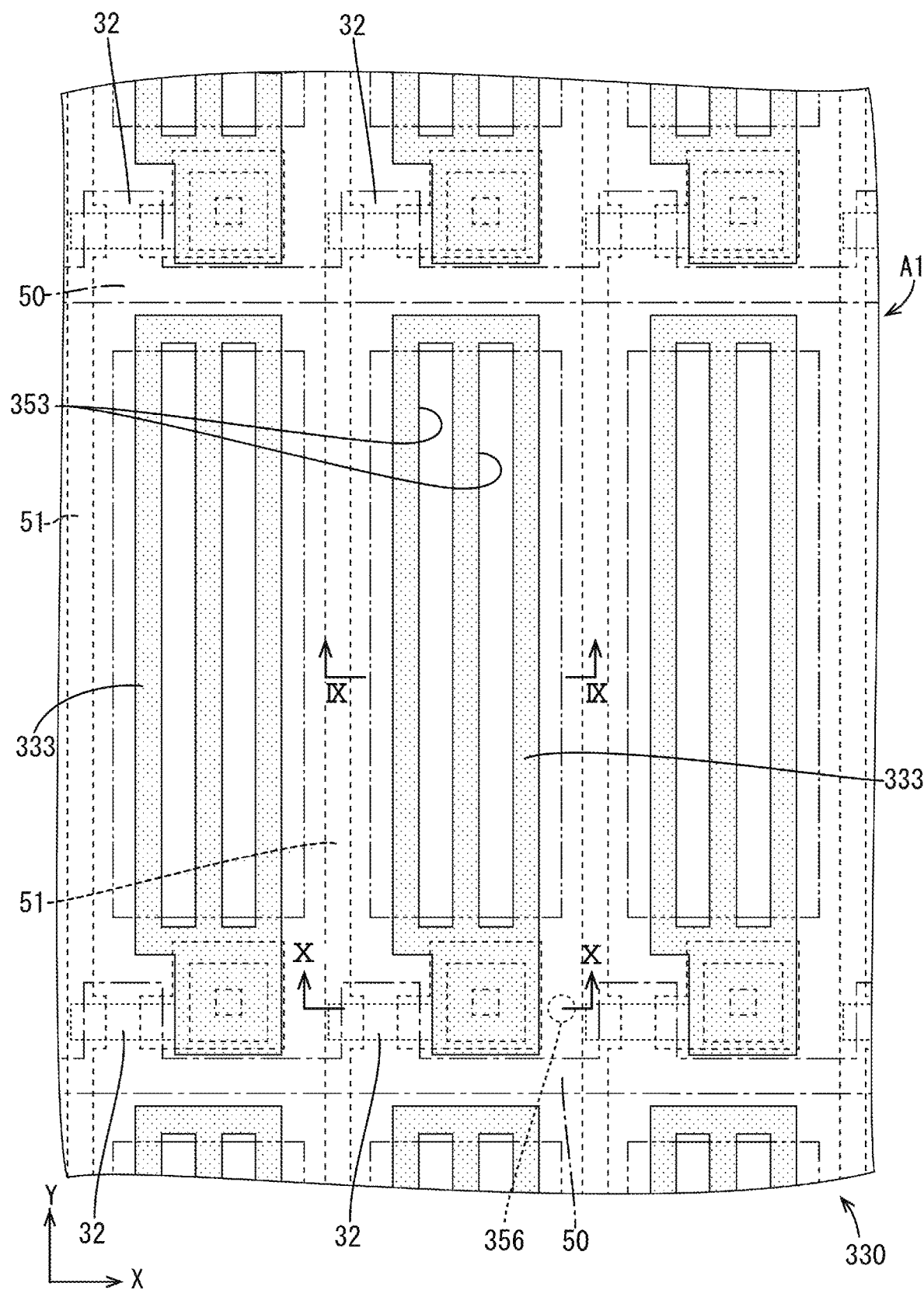
FIG. 8 is a plan view illustrating pixels of an array substrate according to a third embodiment.
Figure 9:
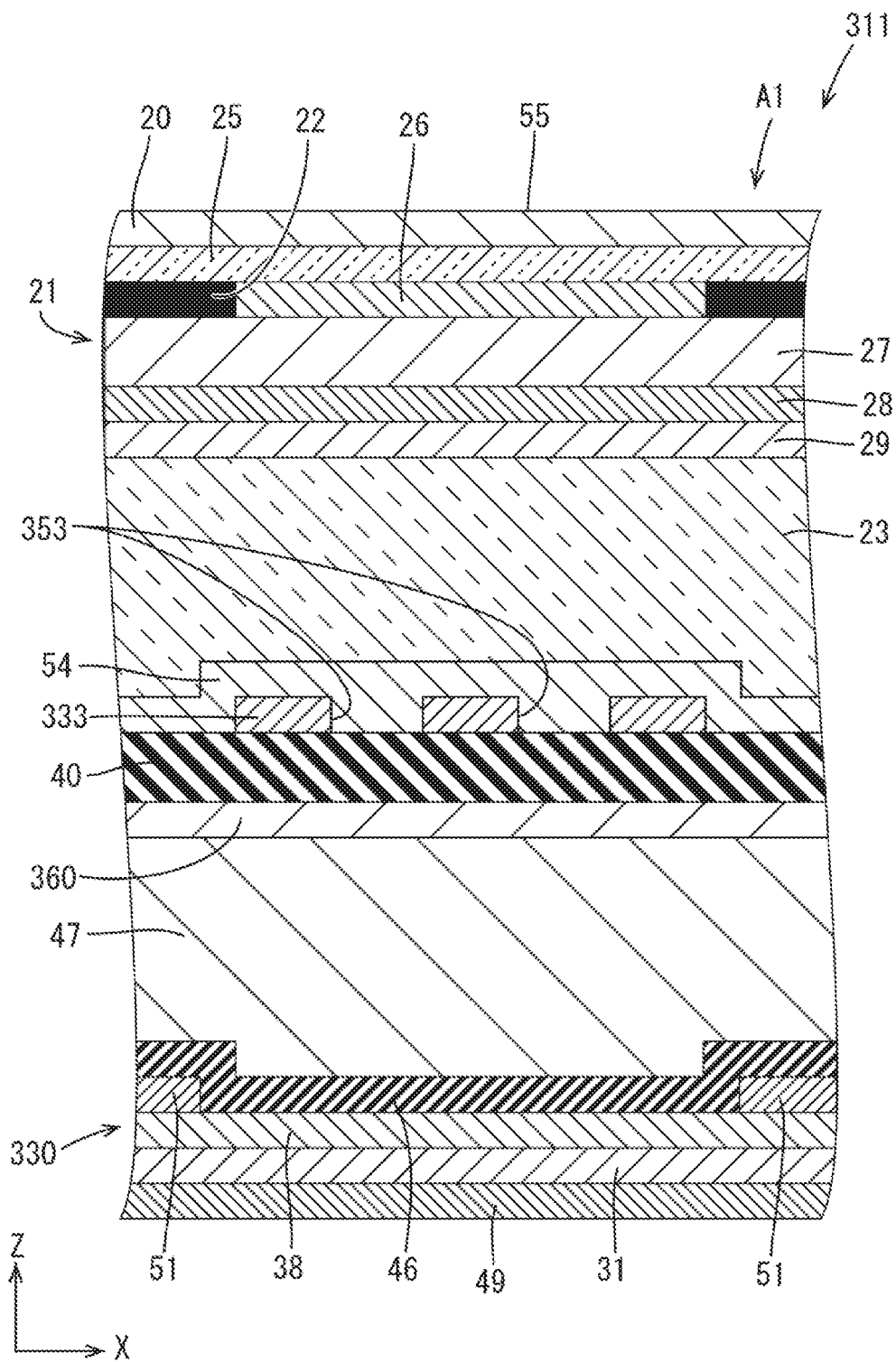
FIG. 9 is a cross-sectional view of a liquid crystal panel taken along line IX-IX in FIG. 8.
Figure 10:
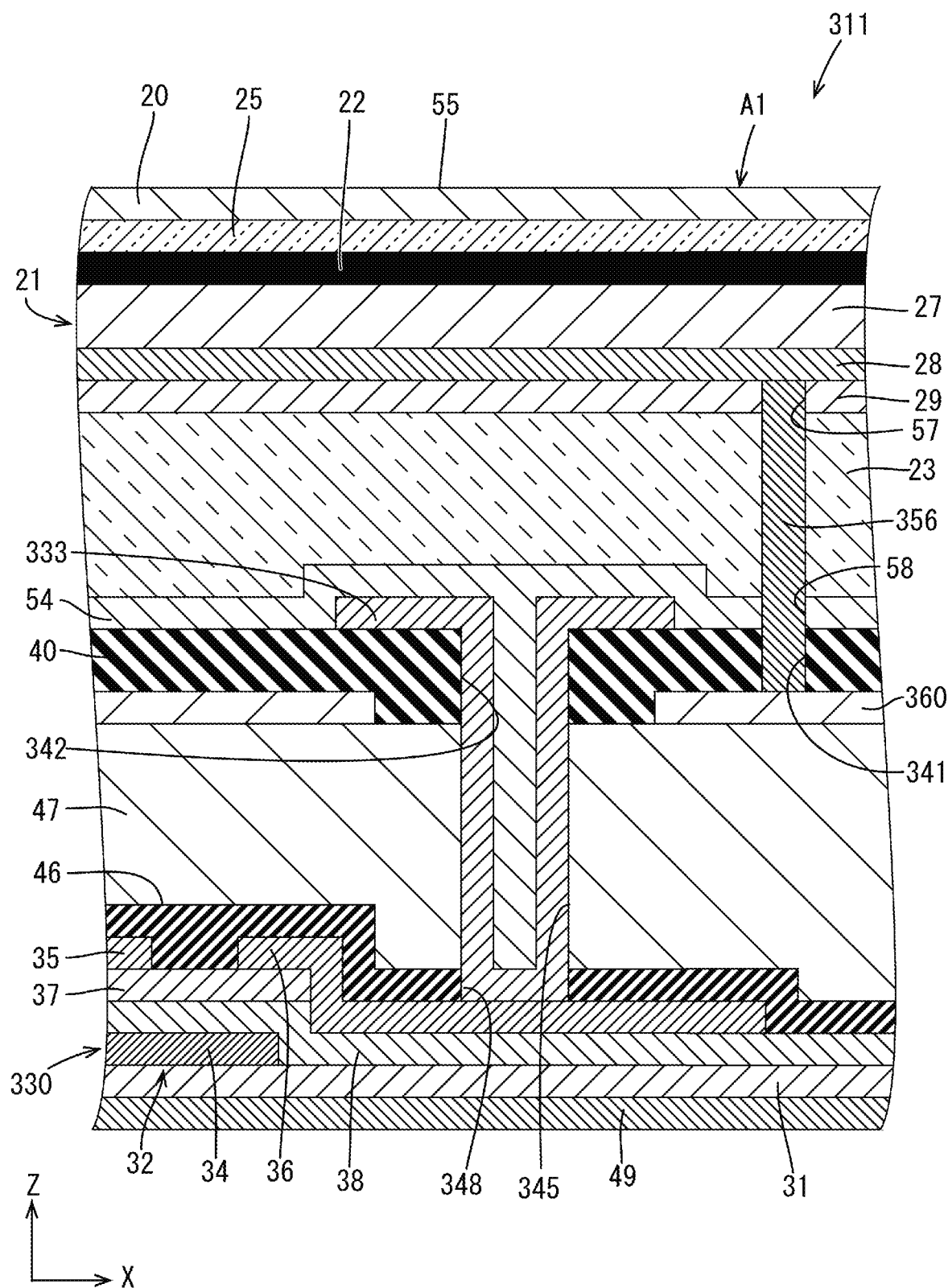
FIG. 10 is a cross-sectional view of the liquid crystal panel taken along line X-X in FIG. 8.

Next, a third embodiment will be described with reference to FIGS. 8 to 10. Components same as those of the above embodiments are provided with the same symbols and will not be described. In a liquid crystal panel 311 according to this embodiment, arrangement of the position detection electrode and the pixel electrode differs from that of the above embodiments. As illustrated in FIGS. 8 and 9, an array substrate 330 according to this embodiment includes pixel electrodes 333 closer to the liquid crystal layer 23 than position detection electrodes 360 are. The position detection electrodes 360 function as the common electrode. The pixel electrodes 333 are connected to the drain electrode 36 through contact holes 342, 345, 348 that are formed in the insulation films 40, 46 and the flattening film 47, respectively. In this embodiment, as illustrated in FIG. 8, the pixel electrode 333 has slits 353. As illustrated in FIG. 10, a spacer 356 is contacted with the position detection electrode 360 and the transparent electrode 28. The alignment films 29, 54 have the through holes 57, 58, respectively, and the insulation film 40 has a through hole 341 at a portion corresponding to the spacer 356. Accordingly, the transparent electrode 28 and the position detection electrode 360 are partially exposed. According to this embodiment, potential difference is caused between the pixel electrode 333 and the position detection electrode 360 and potential difference is caused between the pixel electrode 333 and the transparent electrode 28. Thus, an electric field of greater intensity can be created compared to that created in the configuration of the first or second embodiment and light transmittance of the liquid crystal layer 23 is further increased.

Fourth Embodiment

Figure 11:
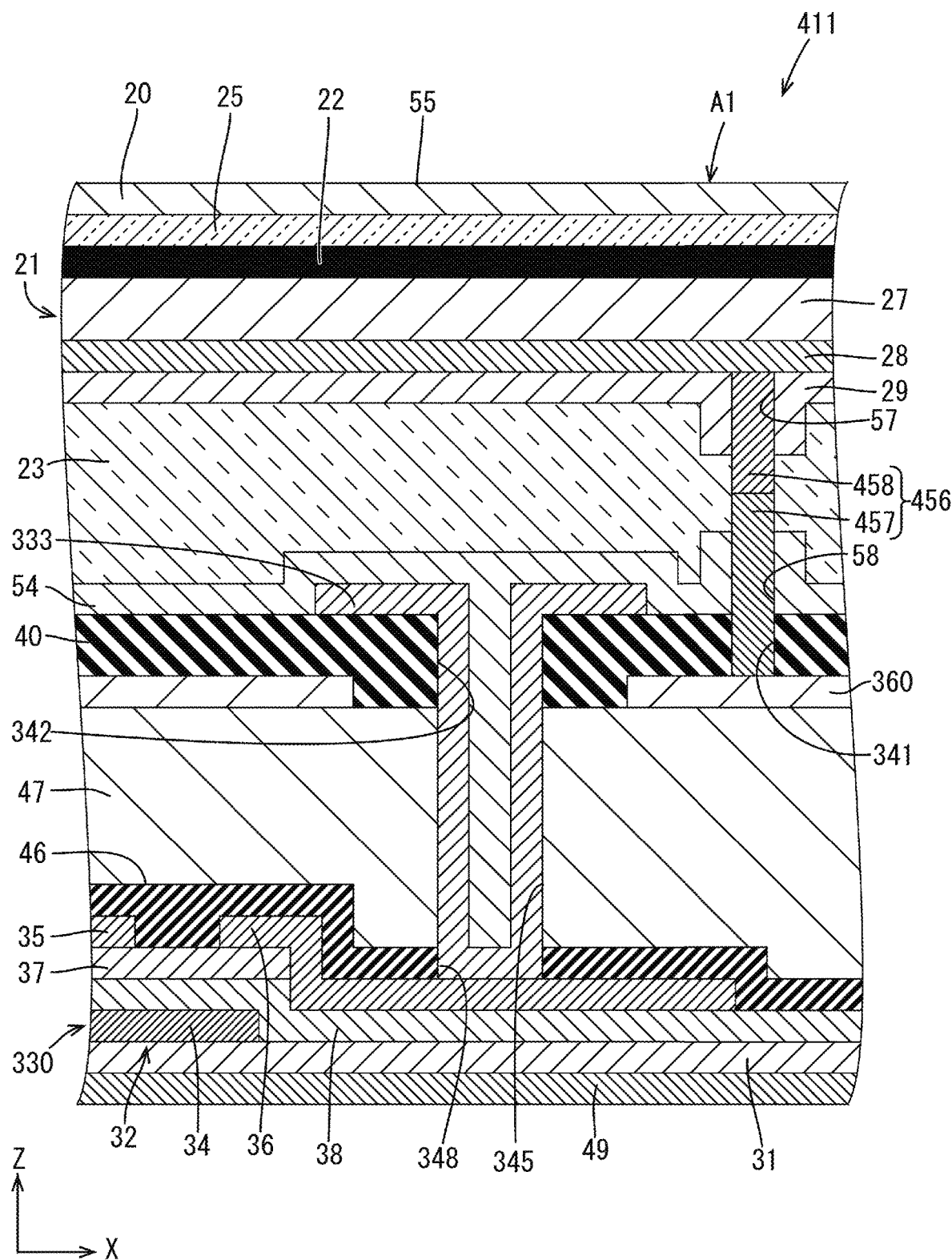
FIG. 11 is a cross-sectional view of a liquid crystal panel according to a fourth embodiment.

Next, a fourth embodiment will be described with reference to FIG. 11. Components same as those of the above embodiments are provided with the same symbols and will not be described. In a liquid crystal panel 411 of this embodiment, a configuration of a spacer differs from that of the third embodiment. As illustrated in FIG. 11, a spacer 456 of this embodiment includes a first projecting section 457 projecting from the position detection electrode 360 toward the transparent electrode 28 and a second projecting section 458 projecting from the transparent electrode 28 toward the position detection electrode 360 and having a projected end that is in contact with a projected end of the first projecting section 457. Similar to the second embodiment, in this embodiment, the spacer 456 is configured with a pair of projections (the first projecting section 457 and the second projecting section 458) such that an operation of removing a part of the alignment film 29 and the alignment film 54 is not necessary.

Fifth Embodiment

Figure 12:
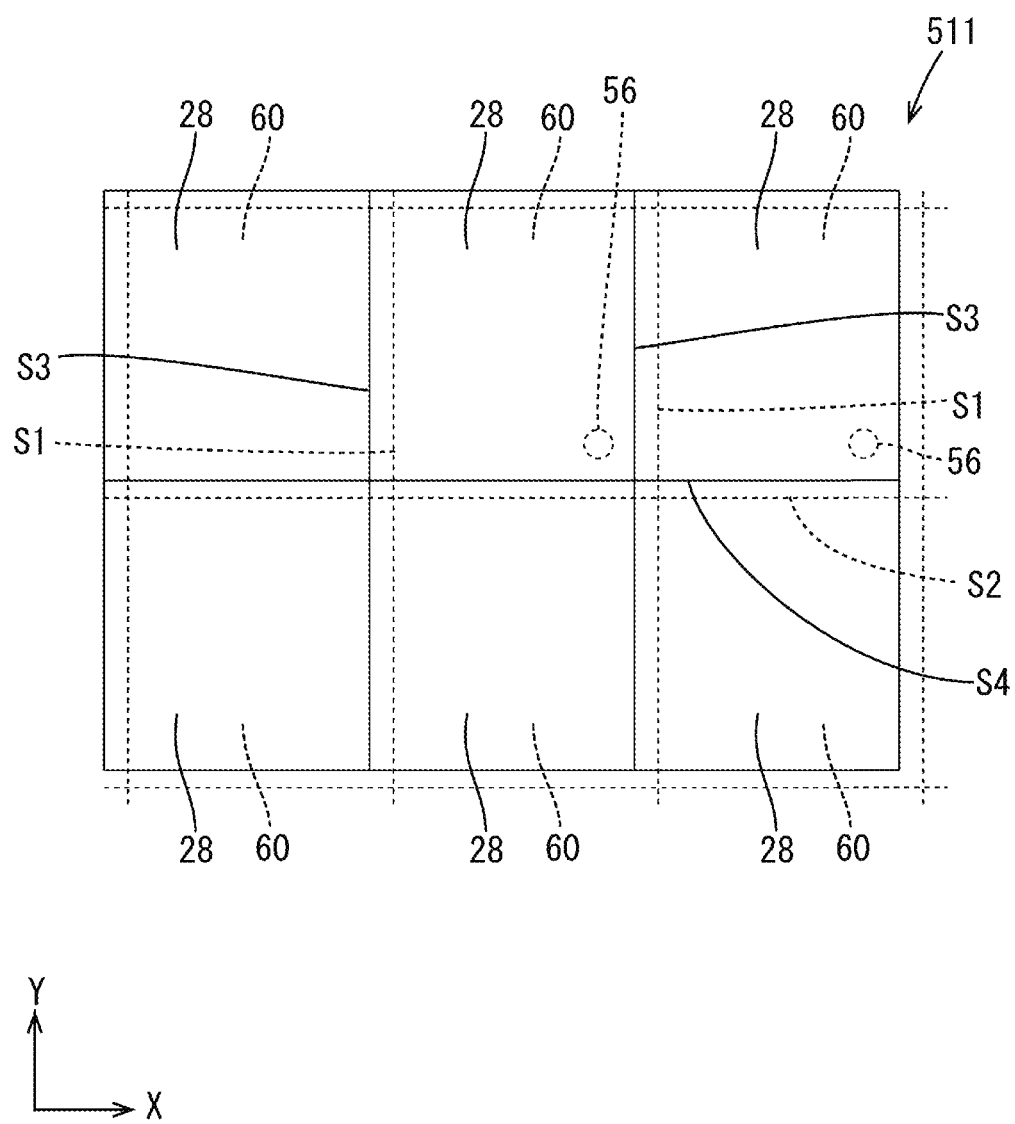
FIG. 12 is a schematic plan view of a liquid crystal panel according to a fifth embodiment.

Next, a fifth embodiment will be described with reference to FIG. 12. Components same as those of the above embodiments are provided with the same symbols and will not be described. In this embodiment, a liquid crystal panel 511 includes the position detection electrodes 60 and the transparent electrodes 28 that have a same square shape and each transparent electrode 28 is slightly displaced from each position detection electrode 60 with respect to a planar surface direction (a X-Y plan direction). According to such a configuration, spaces S3, S4 between the adjacent two transparent electrodes 28 are covered with the peripheral edge portions of the position detection electrode 60. Furthermore, spaces S1, S2 between the adjacent two position detection electrodes 60 are covered with the peripheral edge portions of the transparent electrode 28. In other words, the space S1 between the two adjacent position detection electrodes 60 and the space S3 between the two adjacent transparent electrodes 28 with respect to the X-axis direction do not overlap each other. The space S2 between the two adjacent position detection electrodes 60 and the space S4 between the two adjacent transparent electrodes 28 with respect to the Y-axis direction do not overlap each other.

At the space between the two adjacent transparent electrodes, alignment control of the liquid crystals is more difficult due to the electric field created between the electrodes compared to the section having the transparent electrode (for example, the light transmittance is likely to be increased too much) and display unevenness is likely to be caused. In this embodiment, the spaces S1, S2 between the two adjacent position detection electrodes 60 are covered with the transparent electrodes 28 and the spaces S3, S4 between the adjacent transparent electrodes 28 are covered with the position detection electrodes 60. According to such a configuration, the light transmittance of the spaces S1, S2, S3, S4 is less likely to be higher than that of the surrounding sections of the spaces and the display unevenness is reduced. If the position detection electrode 60 and the transparent electrode 28 that are opposite each other are connected with the spacer 56, the spacer 56 is necessarily arranged at a position where the position detection electrode 60 and the transparent electrode 28 are overlapped. Namely, as the displacement of the position detection electrode 60 and the transparent electrode 28 is greater, the overlapping area of the position detection electrode 60 and the transparent electrode 28 is smaller and an area in which the spacer 56 can be arranged is also smaller. Therefore, the displacement of the position detection electrode 60 and the transparent electrode 28 is preferable to be smaller and is preferably a dimension of about one pixel to some pixels.

Other Embodiments

The technology disclosed herein is not limited to the embodiment, which have been described using the foregoing descriptions and the drawings. For example, embodiments described below are also included in the technical scope.

(1) The operation mode of the liquid crystal panel may be a TN mode or a VA mode. When the TN mode or the VA mode is used in the configuration of the third embodiment or the fourth embodiment, the position detection electrodes 360 that are the transparent electrodes on the array substrate 330 side may be used as an auxiliary capacitance electrode for generating an auxiliary capacitance (storage capacitance) and a potential of the auxiliary capacitance electrode may be set to same as the common potential.

(2) The shape of the spacer is not necessarily a column but may be altered as appropriate. For example, the spacer may have a semi-spherical shape.

The invention claimed is:

1. A liquid crystal panel comprising:
   a first substrate including pixel electrodes and position detection electrodes, the position detection electrodes detecting an input position input with a position inputter based on electrostatic capacitances between the position inputter and the position detection electrodes;
   a second substrate having a display surface displaying an image thereon and being arranged opposite the first substrate, the second substrate including transparent electrodes overlapping the position detection electrodes, respectively;
   a liquid crystal layer disposed between the first substrate and the second substrate; and
   a spacer having conductivity and disposed in a display region where the image is displayed and disposed between the first substrate and the second substrate and being contacted with one of the position detection electrodes and one of the transparent electrodes, wherein
   each of the position detection electrodes overlaps one of the pixel electrodes, respectively, and the position detection electrodes define a common electrode.

2. The liquid crystal panel according to claim 1, wherein the position detection electrodes are arranged closer to the liquid crystal layer than the pixel electrodes are.

3. The liquid crystal panel according to claim 1, wherein the liquid crystal layer includes negative liquid crystals.

4. A liquid crystal panel comprising:
   a first substrate including pixel electrodes and position detection electrodes, the position detection electrodes detecting an input position input with a position inputter based on electrostatic capacitances between the position inputter and the position detection electrodes;
   a second substrate having a display surface displaying an image thereon and being arranged opposite the first substrate, the second substrate including transparent electrodes overlapping the position detection electrodes, respectively;
   a liquid crystal layer disposed between the first substrate and the second substrate; and
   a spacer having conductivity and disposed in a display region where the image is displayed and disposed between the first substrate and the second substrate and being contacted with one of the position detection electrodes and one of the transparent electrodes, wherein
   the spacer includes a first projecting section projecting from one of the position detection electrodes toward one of the transparent electrodes and a second projecting section projecting from the one of the transparent electrodes toward the one of the position detection electrode and the second projecting section has a projected end that is contacted with a projected end of the first projecting section, the first substrate includes a first alignment film between the position detection electrodes and the liquid crystal layer, and the second substrate includes a second alignment film between the transparent electrodes and the liquid crystal layer.

5. A liquid crystal panel comprising:

a first substrate including pixel electrodes and position detection electrodes, the position detection electrodes detecting an input position input with a position inputter based on electrostatic capacitances between the position inputter and the position detection electrodes;

a second substrate having a display surface displaying an image thereon and being arranged opposite the first substrate, the second substrate including transparent electrodes overlapping the position detection electrodes, respectively;

a liquid crystal layer disposed between the first substrate and the second substrate; and a spacer having conductivity and disposed in a display region where the image is displayed and disposed between the first substrate and the second substrate and being contacted with one of the position detection electrodes and one of the transparent electrodes, wherein the position detection electrodes and the transparent electrodes have a same square shape and each of the position detection electrodes has a peripheral edge portion, and the peripheral edge portion covers a space between two of the positon detection electrodes that are adjacent to each other.

* * * * *